United States Patent
Dean et al.

(10) Patent No.: US 6,182,131 B1
(45) Date of Patent: Jan. 30, 2001

(54) DATA PROCESSING SYSTEM, METHOD, AND PROGRAM PRODUCT FOR AUTOMATING ACCOUNT CREATION IN A NETWORK

(75) Inventors: Jeffrey Randell Dean; Jeffrey Langdon Howard; Ingrid Milagros Rodriguez, all of Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/118,557

(22) Filed: Jul. 17, 1998

(51) Int. Cl.[7] ................................................. G06F 13/00
(52) U.S. Cl. ............................................................ 709/222
(58) Field of Search ............................................... 709/222

(56) References Cited

U.S. PATENT DOCUMENTS

| | | | |
|---|---|---|---|
| 5,708,812 | * | 1/1998 | Van Dyke et al. ............ 717/11 |
| 5,872,914 | * | 2/1999 | Walker, Jr. et al. ........... 713/202 |
| 5,978,462 | * | 11/1999 | Fuhrmann et al. ............ 379/201 |
| 6,065,054 | * | 5/2000 | Dutcher et al. ................ 709/226 |
| 6,067,568 | * | 5/2000 | Li et al. ......................... 709/223 |

OTHER PUBLICATIONS

Method for Migrating LAN Area Network Server Accounts to Distributed Computing Environment Registry; IBM Technical Disclosure Bulletin; vol. 37, No. ; pp. 139, 140, Aug. 1994.*

* cited by examiner

*Primary Examiner*—Kenneth R. Coulter
(74) *Attorney, Agent, or Firm*—Leslie A. Van Leeuwen; Felsman, Bradley, Vaden, Gunter & Dillon, LLP

(57) ABSTRACT

A data processing system, method, and program product for automating creation of accounts in a network are disclosed. According to the method, an account registry for a first network is accessed in response to a selected input in order to obtain account information including a plurality of usernames. The account information is then provided to an account manager for a second network that, in response to receipt of the account information, automatically creates accounts in the second network for each of the plurality of usernames.

13 Claims, 2 Drawing Sheets

DATA PROCESSING SYSTEM, METHOD, AND PROGRAM PRODUCT FOR AUTOMATING ACCOUNT CREATION IN A NETWORK

BACKGROUND OF THE INVENTION

1. Technical Field

The present invention relates in general to data processing and, in particular, to a data processing system and method for creating accounts in a network. Still more particularly, the present invention relates to a data processing system and method that automate account creation in a network.

2. Description of the Related Art

Companies and other organizations now frequently utilize local area networks (LANs) to perform many essential business functions, for example, file sharing, routing intra-office information, calendaring, data processing, printing, etc. When an organization expands its communication capabilities by obtaining access to an additional network such as the Internet or World Wide Web, it is often desirable to provide an individual account on the new network for each of number of users of the LAN.

Heretofore, the process of creating individual accounts on the new network was laborious and involved manually entering into a computer each individual username or user ID for which an account was to be created. Thus, the conventional method of account creation is very time consuming in cases in which numerous accounts are to be established and is prone to human error in entering the selected usernames or user IDs. It would therefore be useful and desirable to provide an improved method of account creation in a network that addresses these shortcomings.

SUMMARY OF THE INVENTION

The present invention provides a data processing system, method, and program product for automating the creation of accounts in a network. According to the present invention, an account registry for a first network is accessed in response to a selected input in order to obtain account information including a plurality of usernames. The account information is then provided to an account manager for a second network that, in response to receipt of the account information, automatically creates accounts in the second network for each of the plurality of usernames.

All objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF ILLUSTRATIVE EMBODIMENT

Figure 1:
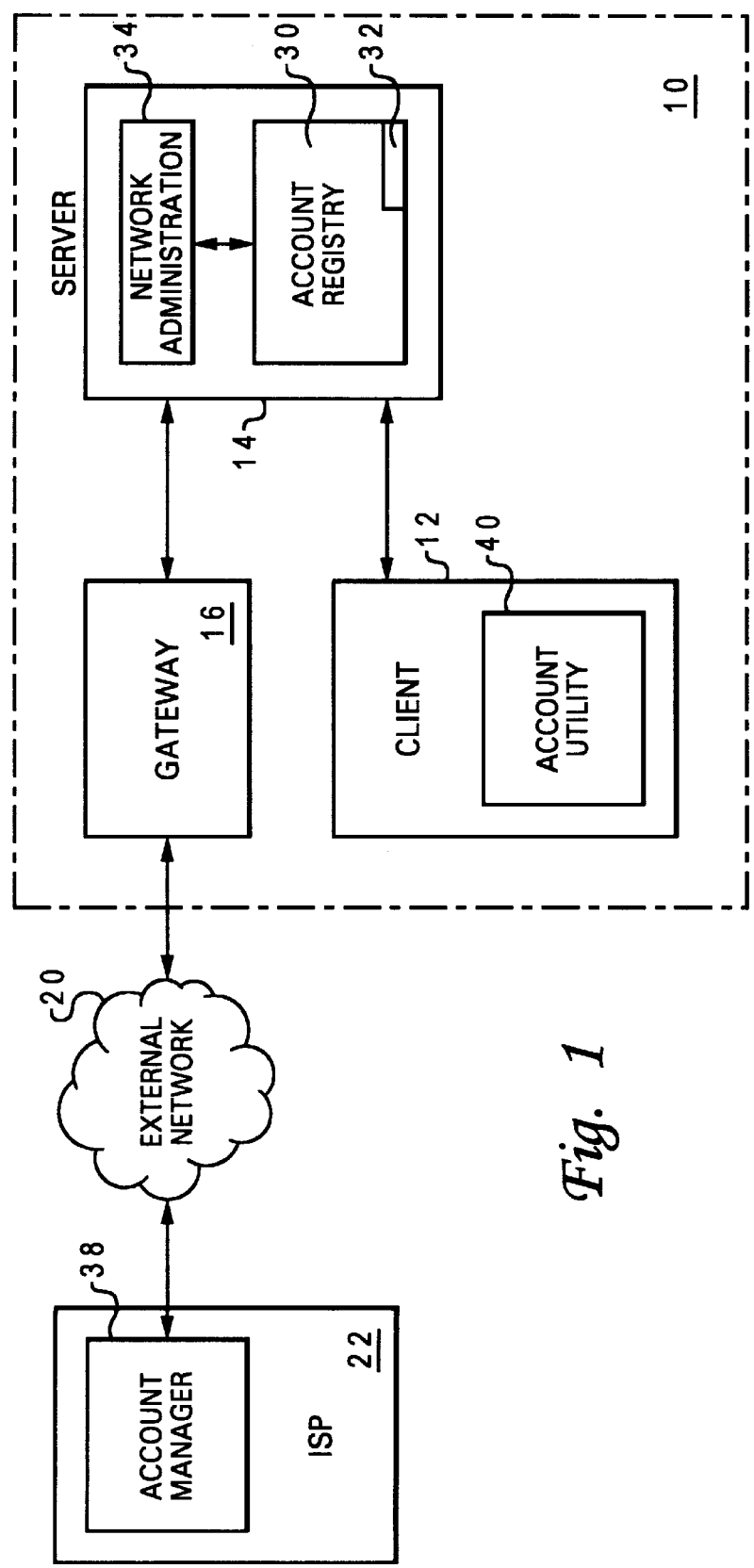
FIG. 1 depicts an illustrative embodiment of a data processing system with which the method and system of the present invention may advantageously be utilized.

The present invention can be utilized in any environment in which it is desirable to create accounts for a second network or domain in an automated fashion utilizing account information for a first network or domain. However, with reference now to the figures and in particular with reference to FIG. 1, there is depicted an illustrative embodiment of a computer network environment in which the present invention may advantageously be utilized.

As illustrated, a local area network (LAN) 10 may include a client 12, a server 14, and a gateway 16, which are interconnected utilizing a selected network topology. As will be appreciated by those skilled in the art, client 12, server 14, and gateway 16 can be implemented with one or more special-purpose or general-purpose computers. LAN 10 is coupled to an external network 20, which in the illustrated embodiment comprises the Internet or World Wide Web, via gateway 16. Thus, gateway 16 serves as a bridge for communication between LAN 10 and external network 20. External network 20 may in turn be connected to numerous other LANs, computer systems, and devices including those collectively designated as Internet Service Provider (ISP) 22.

Within LAN 10, server 14 runs network administration software 34 that controls access to LAN 10 and its resources and provides resources to client(s) 12. Network administration software 34 may include, for example, a number of network administration programs running under the Windows NT™ operating system produced by Microsoft Corporation of Redmond, Wash. In order to permit and regulate access to the resources of LAN 10, each user is assigned a unique username (or user ID) and a password by network administration software 34. The user's access to LAN 10 may also be characterized by a user priority, access permissions, or other information. All of these pieces of information, hereinafter referred to collectively as account information, are stored within one of the user accounts 32 in account registry 30. Thus, a user desiring access to the resources of LAN 10 is first authenticated to server 14 in response to correct entry of the user's assigned username and password via client 12. The user's access to the resources of LAN 10 may thereafter be further regulated by network administration software 34 by reference to the account information in the user's account 32 within account registry 30.

As discussed above, it is often desirable for multiple users of LANs such as LAN 10 to have access to additional networks or domains, such as external network 20. Such access can be provided by establishing an individual account for each user with ISP 22. In the past, creating new accounts with ISP 22 for each of the hundreds or thousands of users of LAN 10 would be a laborious task since each account would have to be created individually with account manager software 38 by manually entering via a computer keyboard (or the like) each user's username, password, priority, privileges, etc. However, according to the present invention, the account creation process can be automated through the use of an account utility 40, thereby dramatically reducing the amount of time required to create accounts for large numbers of users and eliminating the possibility of human error at ISP 22.

Figure 2:
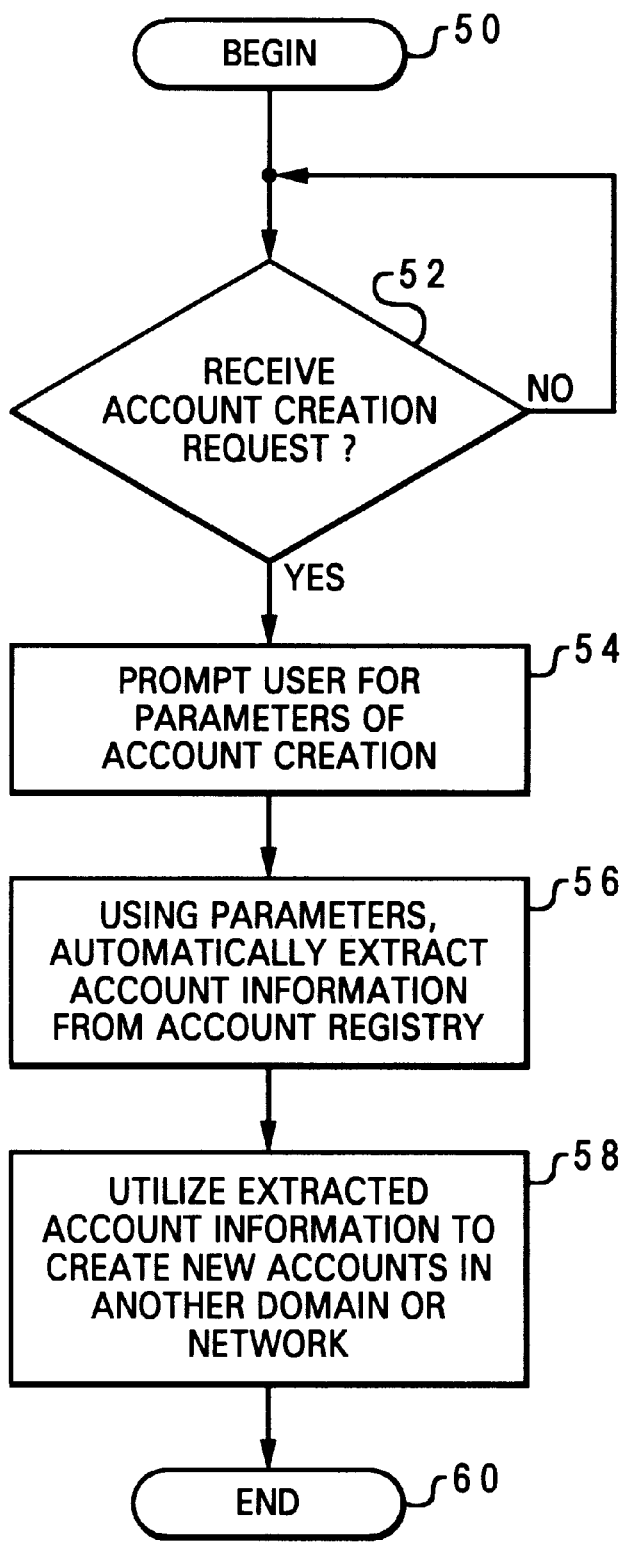
FIG. 2 illustrates a high level logical flowchart of an exemplary embodiment of an automated method for creating accounts in a network in accordance with the present invention.

Referring now to FIG. 2, there is illustrated a high level logical flowchart of an exemplary embodiment of an automated process of account creation in a network environment. As depicted, the process begins at block 50 and thereafter proceeds to block 52, which illustrates a determination of whether or not account utility 40 has received an account creation request from a user of LAN 10. Preferably, such account creation requests are valid only if issued by a user having sufficient privileges, such as a superuser or network administrator. If no valid account creation request has been received, the process simply iterates at block 52 until such time as a valid account creation request is received. In response to receipt of a valid account creation request by account utility 40, for example, through entry of a keyboard command via client 12, the process proceeds from block 52 to block 54.

Block 54 depicts account utility 40 prompting the user that originated the account creation request to enter parameters of the account creation process. The account creation process can be governed by any number of user-supplied or default parameters, including the number, priority, or privileges of users for whom the new accounts will be created, a new sub-domain name through which the new accounts will be accessed, a default password or passwords for the new accounts, the amount of account information from account registry 30 that is to be included in the new accounts, etc. Next, the process proceeds to block 56, which illustrates account utility 40 utilizing the parameters determined at block 54 to automatically extract account information (i.e., at a minimum the username) from each user account 32 in account registry 30 that satisfies the account creation criteria. Thus, the parameters determined at block 54 permits the user that requested account creation to easily determine which users of LAN 10 are selected to be given new accounts. Then, as shown in block 58, the account information extracted from account registry 30 is utilized to automatically create accounts for the selected users in another domain or network. In the illustrative embodiment shown in FIG. 1, the step illustrated at block 58 entails transmitting the extracted account information from LAN 10 to account manager 38 in ISP 22. Account manager 38 then utilizes the received account information to automatically create individual user accounts (e.g., Internet and Internet e-mail accounts) for external network 20 without the account information having to be manually input for each account by a human operator. In an alternative embodiment, the extracted account information could be utilized by network administration software 34 to automatically create accounts within a new sub-domain of LAN 10. In this alternative embodiment, account manager 38 would form a part of network administration software 34. The process illustrated in FIG. 2 thereafter proceeds to block 60 and terminates.

As has been described, the present invention provides an improved data processing system and method for automatically creating user accounts in a network. Besides the improved speed and reduced error concomitant with automation, the present invention also advantageously permits usernames (and possibly passwords) to be consistent for all accounts owned by the same user, which eliminates the need to verify username uniqueness for the newly created accounts.

While the invention has been particularly shown and described with reference to an illustrative embodiment, it will be understood by those skilled in the art that various changes in form and detail may be made therein without departing from the spirit and scope of the invention. For example, although account utility 40 has been described as residing on and executed by client 12, account utility 40 could alternatively reside and be executed elsewhere within LAN 10, such as on server 14. In addition, although aspects of the present invention have been described with respect to a computer system executing software that directs the method of the present invention, it should be understood that present invention may alternatively be implemented and distributed as a computer program product for use with a computer system. Programs defining the functions of the present invention can be delivered to a computer system via a variety of signal-bearing media, which include, without limitation, storage media (e.g., CD-ROM, floppy diskette, or hard disk drive) and communication media, such as computer and telephone networks. It should be understood, therefore, that such signal-bearing media, when encoding computer readable instructions that direct the functions of the present invention, represent alternative embodiments of the present invention.

What is claimed is:

1. A program product, comprising:
   a computer-usable medium; and
   an account utility encoded in said computer-usable medium, wherein responsive to receipt of account creation criteria identifying accounts among a plurality of accounts in an account registry of a first network and at least one item of account information, said account utility causes a computer to extract from identified accounts in the account registry only items of account information that satisfy that account creation criteria and to electronically provide said extracted items of account information to an account manager for a second network, wherein the extracted items of account information include at least the username of each identified account but less than all items of account information for the identified accounts.

2. The program product of claim 1, and further comprising an account manager that, in response to receipt of said extracted items of account information, causes a computer to automatically create accounts in said second network for each username extracted from the account registry.

3. The program product of claim 2, wherein said account manager causes a computer to automatically create accounts in said second network that each have an associated username that identically matches a username of an identified account.

4. The program product of claim 1, wherein said identified accounts include less than all of said plurality of accounts in said account registry.

5. An automated method for creating accounts in a network, said method comprising:
   accessing an account registry of a first network, wherein said account registry contains a plurality of accounts that each contain a username and at least one other item of account information;
   in response to receipt of account creation criteria identifying accounts among said plurality of accounts and at least one item of account information, extracting from identified accounts among said plurality of accounts only items of account information that satisfy the account creation criteria, wherein the extracted items of account information include at least the username of each identified account but less than all items of account information for the identified accounts;
   electronically providing said extracted items of account information to an account manager for a second network; and
   in response to receipt of said extracted items of account information by said account manager, automatically creating an account in said second network for each username extracted from the account registry utilizing the extracted items of account information.

6. The method of claim 5, wherein said second network is a subset of said first network and wherein automatically creating an account comprises automatically creating an account for said subset of said first network for each username extracted from the account registry.

7. The method of claim 5, wherein extracting account information from identified accounts comprises extracting account information from less than all of said plurality of accounts.

8. The method of claim 5, wherein automatically creating accounts in said second network for each of said plurality of usernames comprises automatically creating accounts in said second network that each have an associated username that identically matches a username of an identified account.

9. A data processing system, comprising:

an account registry that contains a plurality of accounts for users of a first network, wherein each of said plurality of accounts contains a username and at least one other item of account information;

an account utility that, in response to receipt of account creation criteria identifying accounts among said plurality of accounts and at least one item of account information, extracts from identified accounts in the account registry only items of account information that satisfy the account creation criteria and electronically provides the extracted items of account information to an account manager for a second network, wherein the extracted items of account information include at least the username of each identified account but less than all items of account information for the identified accounts; and computing resources that run said account registry and said account utility.

10. The data processing system of claim 9, and further comprising:

an account manager that, in response to receipt of said extracted items of account information, automatically creates accounts in said second network for each username extracted from the account registry utilizing the extracted items of account information.

11. The data processing system of claim 10, wherein said second network is a subset of said first network.

12. The data processing system of claim 10, wherein said account manager automatically creates accounts in said second network that each have an associated username that identically matches a username of an identified account.

13. The data processing system of claim 9, wherein said identified accounts include less than all of said plurality of accounts in said account registry.

\* \* \* \* \*